US010185550B2

(12) United States Patent
Smith et al.

(10) Patent No.: US 10,185,550 B2
(45) Date of Patent: Jan. 22, 2019

(54) DEVICE-DRIVEN AUTO-RECOVERY USING MULTIPLE RECOVERY SOURCES

(71) Applicant: McAfee, Inc., Santa Clara, CA (US)

(72) Inventors: Ned M. Smith, Beaverton, OR (US); Zheng Zhang, Portland, OR (US); Thiago J. Macieira, Portland, OR (US)

(73) Assignee: McAfee, Inc., Santa Clara, CA (US)

( * ) Notice: Subject to any disclaimer, the term of this patent is extended or adjusted under 35 U.S.C. 154(b) by 62 days.

(21) Appl. No.: 15/278,936

(22) Filed: Sep. 28, 2016

(65) Prior Publication Data

US 2018/0088928 A1 Mar. 29, 2018

(51) Int. Cl.
*G06F 8/65* (2018.01)
*H04L 29/08* (2006.01)

(52) U.S. Cl.
CPC ............... *G06F 8/65* (2013.01); *H04L 67/34* (2013.01)

(58) Field of Classification Search
CPC .............. G06F 8/60–8/78; G06F 9/445; G06F 9/44505; G06F 9/4451; H04L 67/34
See application file for complete search history.

(56) References Cited

U.S. PATENT DOCUMENTS 6,678,888 B1   1/2004  Sakanishi
7,424,602 B2 *  9/2008  Reiss ................ G06F 9/44505
                                                       717/168
8,918,775 B1  12/2014  Carpenter et al.
(Continued)

FOREIGN PATENT DOCUMENTS

GB        2549085 A  * 10/2017  ............. H04L 67/34
WO     2018064154       4/2018

OTHER PUBLICATIONS

Christidis, Konstantinos, and Michael Devetsikiotis. "Blockchains and Smart Contracts for the Internet of Things." Received Apr. 23, 2016, accepted May 8, 2016, date of publication May 10, 2016, date of current version Jun. 3, 2016. IEEE Special Section on the Plethora of Research in Internet of Things (IoT). pp. 2292-2303.*

(Continued)

*Primary Examiner* — Emerson C Puente
*Assistant Examiner* — Erika Kretzmer
(74) *Attorney, Agent, or Firm* — Hanley, Flight and Zimmerman, LLC

(57) ABSTRACT

Updating computer program(s) installed on a programmable device using a distributed ledger that is based on cryptography and blockchain technology is described. A distributed ledger logic/module can commit, to the distributed ledger, a first configuration of a computer program installed on a device. The logic/module can also receive requests to apply a first update and a second update to the first configuration. The logic/module can receive a second configuration of the computer program that is based on the first update and the first configuration, and also commit the second configuration to the distributed ledger. Furthermore, the logic/module can determine that the second update cannot be applied to the first configuration and receive a third configuration of the computer program that is based on the second update and the second configuration. The logic/module can also commit the third configuration to the distributed ledger. Other advantages and embodiments are described.

26 Claims, 6 Drawing Sheets

(56) References Cited

U.S. PATENT DOCUMENTS

| | | |
|---|---|---|
| 2007/0157170 A1* | 7/2007 | Reiss .................. G06F 9/44505 |
| | | 717/121 |
| 2013/0036328 A1 | 2/2013 | Mutisya et al. |
| 2013/0055233 A1 | 2/2013 | Hatton et al. |
| 2015/0095899 A1 | 4/2015 | Carpenter et al. |
| 2016/0261690 A1* | 9/2016 | Ford .................. H04L 67/1044 |
| 2017/0213209 A1* | 7/2017 | Dillenberger ...... G06Q 20/3829 |

OTHER PUBLICATIONS

Drescher, Daniel. "Blockchain Basics: A Non-Technical Introduction in 25 Steps." Chapter 24. Mar. 16, 2017. Apress. pp. 1-6.*

International Searching Authority, "Search Report and Written Opinion," issued in connection with International Patent Application No. PCT/US2017/053696, dated Jan. 5, 2018, 10 pages.

Hardjono et al., "Cloud-Based Commissioning of Constrained Devices Using Permissioned Blockchains" IoTPTS 16 Proceedings of the 2nd ACM International Workshop on IoT Privacy, Trust, and Security, May 2016, pp. 29-36 (8 pages).

\* cited by examiner

US 10,185,550 B2

DEVICE-DRIVEN AUTO-RECOVERY USING MULTIPLE RECOVERY SOURCES

TECHNICAL FIELD

Embodiments described herein generally relate to the field of programmable devices. More particularly, embodiments described herein relate to updating a computer program (e.g., software, firmware, etc.) installed on one or more interconnected programmable devices.

BACKGROUND ART

Programmable devices—such as internet of things (IoT) devices, mobile computing devices, and cloud computing devices—can make up a computer network of interconnected programmable devices (hereinafter "a computer network"). In such a network, each programmable device includes one or more computer programs (e.g., software, firmware, etc.) for performing its operations and functionalities. Furthermore, each device's computer program(s) may be updated to bring such a device up to date, fix problems affecting the device, and/or improve the device's characteristics.

In some scenarios, an update to a device in a computer network can have a negative impact on at least one of the devices in a computer network. For example, a major version upgrade performed on devices in a computer network can disable one or more of the devices in the computer network, which can in turn cause a negative impact on the availability of devices in the computer network. Consequently, some updates may add risks to the operational integrity of a computer network.

The problem described above is compounded in computer networks because such networks rely on centralized communication models, otherwise known as the server/client model. The servers used in the server/client model are potential bottlenecks and failure points that can disrupt the functioning of an entire computer network. Additionally, these servers are vulnerable to security compromises (e.g., man-in-the-middle attacks, etc.) because all data associated with the multiple devices of a computer network must pass through the servers.

Another challenge facing computer networks is the need for interoperability across a highly heterogeneous group of devices that are serviced by many vendors. In at least one scenario, a data modeling system (DMS) is used to achieve interoperability. Defects (e.g., bugs, etc.) in the DMS or the abstracted data may cause failures in one or more devices of the computer network.

The problem described above is further compounded when a computer network includes one or more "orphaned devices." As used herein, an "orphaned device" and its variations refer to a programmable device whose computer programs are no longer supported by its original developers but by third ($3^{rd}$) party updating services. It may be difficult to update orphaned devices in a computer network comprised of a highly heterogeneous group of devices. This is because the $3^{rd}$ party updating services may lack access to a DMS that can enable such updates.

DESCRIPTION OF EMBODIMENTS

Figure 1:
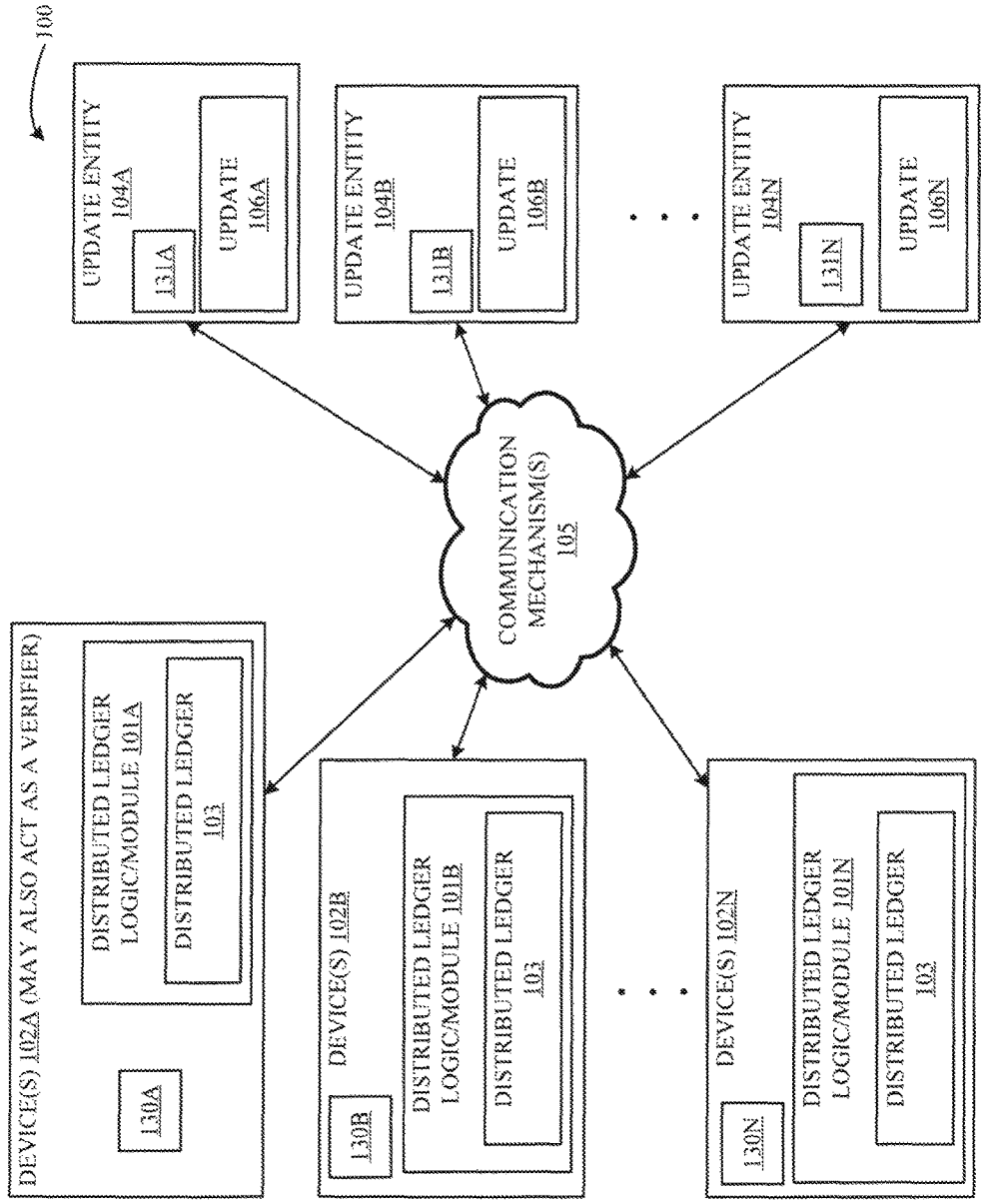
FIG. 1 is a block diagram illustrating a computer network comprised interconnected programmable devices according to one embodiment.

Embodiments described herein relate to updating computer program(s) installed on one or more programmable devices of a computer network using a distributed ledger that is available to multiple devices of the computer network. As such, one or more of the embodiments described herein provides an alternative to the central communication model of updating computer programs (i.e., the client/server model). Consequently, at least one of the embodiments described herein is directed to improving computer functionality. In particular, at least one of the embodiments described herein can assist with one or more of the following: (i) minimizing or eliminating faulty updates to devices of a computer network that have the potential to disable one or more devices of the computer network; (ii) minimizing or eliminating risks to the operational integrity of a computer network caused by faulty updates; (iii) minimizing or eliminating the use of servers as the only update entities because such servers are potential bottlenecks and failure points that can disrupt the functioning of an entire computer network; (iv) minimizing or eliminating vulnerabilities caused by security compromises (e.g., man-in-the-middle attacks, etc.) because the data associated with the multiple devices of a computer network does not have to be communicated using a centralized communication model; (v) improving interoperability across a highly heterogeneous group of devices that are serviced by many vendors or $3^{rd}$ party updating services by minimizing or eliminating defects (e.g., bugs, etc.) in a data modeling system (DMS) or abstracted data associated with the DMS; and (vi) enabling $3^{rd}$ party updating services to deploy and install updates on one or more orphaned devices in a computer network, which can assist minimizing failures in the computer network.

In the following description, for purposes of explanation, numerous specific details are set forth in order to provide a thorough understanding of the embodiments described herein. It will be apparent, however, to one skilled in the art that the embodiments described herein may be practiced without these specific details. In other instances, structure and devices are shown in block diagram form in order to avoid obscuring the embodiments described herein. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter in the embodiments described herein. As such, resort to the claims is necessary to determine the inventive subject matter in the embodiments described herein. Reference in the specification to "one embodiment," "an embodiment," "another embodiment," or their variations means that a particular feature, structure, or characteristic described in connection with the embodiments is included in at least one of the embodiment described herein, and multiple references to "one embodiment," "an embodiment," "another embodiment," or their variations should not be understood as necessarily all referring to the same embodiment.

As used herein, the term "programmable device" and its variations refer to a physical object that includes electronic components configured to receive, transmit, and/or process data information. For one embodiment, one or more of the electronic components may be embedded within the physical object, such as in wearable devices and mobile devices (e.g., self-driving vehicles). For one embodiment, the device may also include actuators, motors, control functions, sensors, and/or other components to perform one or more tasks without human intervention, such as drones, self-driving vehicles, and/or automated transporters. The programmable device can refer to a computing device, such as (but not limited to) a mobile computing device, a lap top computer, a wearable computing device, a network device, an internet of things (IoT) device, a cloud computing device, a vehicle, a smart lock, etc.

As used herein, the terms a "program," a "computer program," and their variations refer to one or more computer instructions are executed by a programmable device to perform a task. Examples include, but are not limited to, software and firmware.

As used herein, the term "software update," "update," and their variations refer to modification and/or deletion of one or more computer programs installed on a programmable device. An update includes, but is not limited to, a major version upgrade, a minor version upgrade, a patch, a hotfix, a maintenance release, and a service pack. As such, an update includes moving from a version of a computer program to another version, as well as, moving from one state of a version of a computer program to another state of the same version of the computer program. Updates can be used for fixing security vulnerabilities and other bugs, improving the device's functionality by adding new features, improving power consumption and performance, etc. Updates may be viewed as important features in the life-cycles of programmable devices.

As used herein, the term "computer network" and its variations refer to a collection of interconnected programmable devices that can exchange data with each other. One example of a computer network is a peer-to-peer network. In a computer network, interconnected programmable devices exchange data with each other using a communication mechanism. The connections between interconnected programmable devices are established using either wired or wireless communication mechanisms. Examples of communication mechanisms include, but are not limited to, any type of data network such as a local area network (LAN), a wide area network (WAN) such as the Internet, a fiber network, a storage network, or a combination thereof, wired or wireless. The communication mechanisms also include networking hardware (e.g., switches, gateways, routers, network bridges, modems, wireless access points, networking cables, line drivers, switches, hubs, repeaters, etc.).

As used herein, the term "distributed ledger" and its variations refer to a database that is available to multiple devices of a computer network. One key feature of a distributed ledger is that there is no central data store where a master copy of the distributed ledger is maintained. Instead, the distributed ledger is stored in many different data stores, and a consensus protocol ensures that each copy of the ledger is identical to every other copy of the distributed ledger. A distributed ledger can, for example, be based on a blockchain-based technology, which is known in the art of cryptography and cryptocurrencies (e.g. bitcoin, etherium, etc.). The distributed ledger may provide a publically and/or non-publically verifiable ledger used for updating software in one or more programmable devices of a computer network. Changes in the distributed ledger (e.g., software updates, etc.) represent updates to one or more computer programs installed on one or more programmable devices of a computer network. These changes may be added to and/or recorded in the distributed ledger. For one embodiment, multiple programmable devices of a computer network are required to validate updates, add them to their copy of the distributed ledger, and broadcast their updated distributed ledger to the entire computer network. Each of the programmable devices having the distributed ledger may validate updates according to a validation protocol. For one embodiment, the validation protocol defines a process by which devices of the computer network agree on changes and/or additions to the distributed ledger. For one embodiment, the validation protocol may include the proof-of-work protocol implemented by Bitcoin or a public consensus protocol. For another embodiment, the validation protocol may include a private and/or custom validation protocol. The distributed ledger enables devices in a computer network to agree via the verification protocol on one or more changes and/or additions to the distributed ledger (e.g., to include updates, to delete updates, to reject updates, etc.).

FIG. 1 is a block diagram illustrating a computer network 100 comprised of interconnected programmable devices 102A-N according to one embodiment. As shown, the computer network 100 includes multiple devices 102A-N, multiple update entities 104A-N, and one or more communication mechanisms 105. Each of these elements of the computer network 100 is described in further detail below.

Each of the devices 102A-N can be an internet of things (IoT) device, a mobile computing device, or a cloud computing device. Also, each of the devices 102A-N can include electronic components 130A-N. Examples of the components 130A-N include: processing unit(s) (such as microprocessors, co-processors, other types of integrated circuits (ICs), etc.); corresponding memory; and/or other related circuitry. For one embodiment, each of the devices 102A-N includes a corresponding one of the distributed ledger logic/modules 101A-N, which implements a distributed ledger 103. The ledger 103 is used for updating one or more computer programs installed on one or more of the devices 102A-N. For one embodiment, the distributed ledger 103, which is distributed across at least two of the devices 102A-N, is used to avoid one or more shortcomings of a central communication technique used for updating computer programs (i.e., the server/client model). Although not shown in FIG. 1, for one embodiment, the distributed ledger 103 is replicated on and available to the devices 102A-N and the update entities 104A-N. Thus, for this embodiment, each of the update entities 104A-N includes a corresponding distributed ledger logic/module that is similar to the distributed ledger logic/modules 101A-N described in connection with FIGS. 1-6 throughout this document.

Each of the distributed ledger logic/modules 101A-N can be implemented as at least one of hardware (e.g., electronic circuitry of the processing unit(s), dedicated logic, etc.), software (e.g., one or more instructions associated with a computer program executed by the processing unit(s), software run on a general-purpose computer system or a dedicated machine, etc.), or a combination thereof. For one embodiment, each of the distributed ledger logic/modules 101A-N performs one or more embodiments of techniques for updating a computer program installed on one or more interconnected programmable devices 102A-N, as described herein.

For some embodiments, each of the distributed ledger logic/modules 101A-N is implemented as one or more special-purpose processors with tamper resistance features. Examples of such special-purpose processors include a trusted platform module (TPM) cryptoprocessor, an application specific integrated circuit (ASIC), an application-specific instruction set processor (ASIP), a field programmable gate array (FPGA), a digital signal processor (DSP), any type of cryptographic processor, an embedded processor, a co-processor, or any other type of logic with tamper resistance features that is capable of processing instructions. In this way, the ledger 103 can be implemented and maintained in a secure manner that assists with minimizing or preventing security vulnerabilities. For a further embodiment, the distributed ledger logic/modules 101A-N may be maintained separately from the components 130A-N. For example, the distributed ledger logic/modules 101A may be implemented as one or more special-purpose processors that is separate from the components 130A-N.

In the computer network 100, each of the programmable devices 102A-N includes one or more computer programs (e.g., software, firmware, etc.) for performing its operations and functionalities. Furthermore, each of device 102A-N's computer program(s) may be updated as the computer program(s) are changed or modified by developers or third party updating services. These updates are usually in the form of major version updates, minor version updates, patches, hotfixes, maintenance releases, service packs, etc. The goal of updating computer program(s) installed on the programmable devices 102A-N is to bring such a device up to date or to improve its characteristics. These improvements include, but are not limited to, fixing security vulnerabilities and other bugs, improving the device's functionality by adding new features, or improving power consumption and performance. Such updates, therefore, can be viewed as important features in the lifecycles of IoT devices, mobile computing devices, and cloud computing devices. For a specific embodiment, each of the distributed ledger logic/modules 101A-N is implemented in a trusted execution environment (TREE) of one or more processors of the devices 102A-N. In this way, the TREE acts as an isolated environment for the ledger 103 that runs in parallel with the other computer programs (e.g., software, firmware, etc.) installed on the devices 102A-N.

Each of the update entities 104A-N in the computer network 100 is a computer system that executes various types of processing including delivery of updates. Also, each of the update entities 104A-N can include electronic components 131A-N. Examples of the components 131A-N include: processing unit(s) (such as microprocessors, co-processors, other types of integrated circuits (ICs), etc.); corresponding memory; and/or other related circuitry. As such, each of the update entities 104A-N can be any of various types of computers, including general-purpose computers, workstations, personal computers, servers, etc. For one embodiment, the update entities 104A-N in the computer network 100 are associated with an external entity. For this embodiment, the update entities 104A-N include software update systems of manufacturers of device(s) 102A-N and/or software update systems of $3^{rd}$ party updating services for the device(s) 102A-N. As such, the update entities 104A-N can deliver software updates 106A-N from multiple update sources owned by different entities to the device(s) 102A-N. Examples of software update systems associated with external entities include Internet-based update facilities that facilitate updates for software (e.g., operating systems, etc.) or firmware installed on one or more devices 102A-N. The updates 106A-N provided by the update entities 104A-N can include virus definition updates used by virus scanning programs, drivers to improve functionalities of devices 102A-N, updates to one or more applications installed on the devices 102A-N, upgrades to major or minor versions of firmware or software installed on one or more of the device(s) 102A-N, etc.

Each of the updates 106A-N can be in the form of a bundle, which is used herein to refer to a directory with a standardized hierarchical structure that holds executable code and the resources used by that code. For example, a bundle can include a major version upgrade, a minor version upgrade, a hotfix, a patch, and all resources required to install the bundle's contents on one or more of the devices 102A-N.

The devices 102A-N and the entities 104A-N communicate within the computer network 100 via one or more communication mechanisms 105. These mechanisms 105 comprise one or more different types of communication networks, such as the Internet, enterprise networks, data centers, fiber networks, storage networks, WANs, and/or LANs. Each of the communication mechanisms 105 may provide wired and/or wireless connections between the devices 102A-N and the entities 104A-N that operate in the electrical and/or optical domain, and also employ any number of network communication protocols (e.g., TCP/IP). For example, one or more of the communication mechanisms 105 within the computer network 100 may be a wireless fidelity (Wi-Fi®) network, a Bluetooth® network, a Zigbee® network, and/or any other suitable radio based network as would be appreciated by one of ordinary skill in the art upon viewing this disclosure. It is to be appreciated by those having ordinary skill in the art that the communication mechanism(s) 105 may also include any required networking hardware, such as network nodes that are configured to transport data over computer mechanisms 105. Examples of network nodes include, but are not limited to, switches, gateways, routers, network bridges, modems, wireless access points, networking cables, line drivers, switches, hubs, and repeaters. For embodiment, at least one of the devices 102A-N and/or at least one of the entities 104A-N implements the functionality of a network node.

One or more of the communication mechanisms 105 within the computer network 100 may be configured to implement computer virtualization, such as virtual private network (VPN) and/or cloud based networking. For one embodiment, at least one of the devices 102A-N and/or at least one of the entities 104A-N comprises a plurality of virtual machines (VMs), containers, and/or other types of virtualized computing systems for processing computing instructions and transmitting and/or receiving data over communication mechanism 105. Furthermore, at least one of the devices 102A-N and/or at least one of the entities 104A-N may be configured to support a multi-tenant architecture, where each tenant may implement its own secure and isolated virtual network environment. Although not illustrated in FIG. 1, the computer network 100 can enable at least one of the devices 102A-N and/or at least one of the entities 104A-N to connect to a variety of other types of programmable devices, such as VMs, containers, hosts, storage devices, wearable devices, mobile devices, and/or any other device configured to transmit and/or receive data using wired or wireless communication mechanisms 105.

For some embodiments, the communication mechanism(s) 105 comprise a cellular network for use with at least one of the devices 102A-N and/or at least one of the entities 104A-N. For this embodiment, the cellular network may be capable of supporting of a variety of devices 102A-N and/or the entities 104A-N that include, but are not limited to computers, laptops, and/or a variety of mobile devices (e.g., mobile phones, self-driving vehicles, ships, and drones). The cellular network can be used in lieu of or together with at least one of the other communication mechanisms 105 described above. Cellular networks are known so they are not described in detail in this document.

In some situations, updates 106A-N for the computer program(s) installed on the devices 102A-N are meant to fix problems. However, these updates 106A-N can sometimes introduce new problems (e.g., a software regression, etc.). In some scenarios, an update to a single one of the devices 102A-N (e.g., device 102A, etc.) can disable one or more devices 102A-N (e.g., one or more devices 102B-N, etc.), which can in turn cause risks to the operational integrity of the computer network 100. If an update (e.g., a hotfix, a patch, etc.) to a computer program that is installed on one or more of the devices 102A-N includes new functionality for addressing security vulnerabilities of the computer program, this new functionality may have a more negative effect on the availability of the devices 102A-N than previous versions of the installed computer program thought to present the security vulnerabilities.

The distributed ledger 103, as implemented by the distributed ledger logic/modules 101A-N, can assist with minimizing or eliminating at least one of the problems described in the immediately preceding paragraph. This is because the distributed ledger 103 operates based on the concept of decentralized consensus, as opposed to the currently utilized concept of centralized consensus. Centralized consensus is the basis of the client/server model and it requires one central database or server for deciding which updates are provided to the device(s) 102A-N, and as a result, this can create a single point of failure that is susceptible to security vulnerabilities. In contrast, the distributed ledger 103 operates based on a decentralized scheme that does not require a central database for deciding which updates are provided to one or more of the devices 102A-N. For one embodiment, the computer network 100 enables its nodes (e.g., the devices 102A-N) to continuously and sequentially record the application of the updates 106A-B to the devices 102A-N in a unique chain—that is, in the distributed ledger 103. For one embodiment, the distributed ledger 103 is an append-only record of the updates 106A-B applied to the devices 102A-N that is based on a combination of cryptography and blockchain technology. For this embodiment, each successive block of the distributed ledger 103 comprises a unique fingerprint of the previously applied update. This unique fingerprint can be include at least one of: (i) a hash as is known in the art of cryptography (e.g., SHA, RIPEMD, Whirlpool, Scrypt, HAS-160, etc.); or (ii) a digital signature generated with a public key, a private key, or the hash as is known in the art of generating digital signatures. Examples of digital signature algorithms include secure asymmetric key digital signing algorithms. One advantage of the distributed ledger 103 is that it can assist with securing the authentication of the update source (e.g., the update entities 104A-N), which in turn removes the need for the central database or server that is required in the client/server model. Consequently, the distributed ledger 103 can assist with ensuring that there is never a duplicate one of the updates 106A-B being applied more than once to the devices 102A-N. For example, when the device 102A receives an update 106A from the entity 104A and an update 106B from the entity 104B, the distributed ledger logic/module 101A records the sequence of applying updates 106A-B to the computer program(s) installed on the device 102A. For this example, the records created by the distributed ledger logic/module 101A in the ledger 103 are communicated via the communication mechanism(s) 105 to every other copy of the ledger 103 that is stored on or available to the other distributed ledger logic/module 101B-N. In this way, and for this example, the distributed ledger 103 enables all of the devices 102A-N to maintain a record of when and where the updates 106A-B were applied, which can assist with determining points of failure and minimizing security vulnerabilities.

The distributed ledger 103, as a blockchain, includes information stored in its header that is accessible to the devices(s) 102A-N and/or the entities 104A-N, which enables the devices(s) 102A-N and/or the entities 104A-N to "view" the sequence of updates 106A-N that have been applied to the devices(s) 102A-N. In this way, the distributed ledger 103 is a software design approach that binds devices 102A-N and/or the entities 104A-N together such that commonly obey the same consensus process for releasing or recording what information they hold, and where all related interactions are verified by cryptography. The distributed ledger 103 can be a private blockchain or a public blockchain. Furthermore, the ledger 103 can be a permissioned blockchain or a permissionless blockchain.

One issue associated with distributed ledgers that are based on blockchain technology is that-they are resource-intensive. That is, they require a large amount of processing power, storage capacity, and computational resources that grow as the ledger is replicated on more and more devices. This issue is based, at least in part, on the requirement that every node or device that includes a ledger must process every transaction in order to ensure security, which can become computationally expensive. As such, each device that includes the ledger may have to have access to a sizable amount of computational resources. On programmable devices with fixed or limited computational resources (e.g., mobile devices, vehicles, smartphones, lap tops, tablets, and media players, microconsoles, IoT devices, etc.), processing a ledger may prove difficult.

At least one embodiment of the distributed ledger 103 described herein can assist with minimizing the resource-intensive issue described above. For one embodiment, the distributed ledger 103 is not constructed as a monolithic blockchain with all of its blocks existing on all of the devices 102A-N and/or the entities 104A-N. Instead, the distributed ledger 103 is constructed is as a light ledger based on, for example, the light client protocol for the ethereum blockchain, the light client protocol for the bitcoin blockchain, etc. In this way, the ledger 103 may be replicated on the devices 102A-N and/or the entities 104A-N on an as-needed basis. For one embodiment, any one of the devices 102A-N and/or the entities 104A-N that is resource-constrained will only store the most recent blocks of the ledger 103 (as opposed to all of the blocks of the ledger 103). For this embodiment, the number of blocks stored by a particular device or entity can be determined dynamically based on its storage and processing capabilities. For example, any one of the devices 102A-N and/or the entities 104A-N can store (and also process) only the current block and immediately following block of the ledger 103. This ensures that any consensus protocols required to add new blocks to ledger 103 can be executed successfully without requiring all the devices 102A-N and/or the entities 104A-N to store the ledger 103 as a large monolithic blockchain. For another embodiment, each block of a ledger 103 may be based on a light client protocol such that the block is broken into two parts: (a) a block header showing metadata about which one of the updates 106A-N was committed to the block; and (b) a transaction tree that contains the actual data for the committed one of the updates 106A-N in the block. For this embodiment, the block header can include at least one of the following: (i) a hash of the previous block's block header; (ii) a Merkle root of the transaction tree; (iii) a proof of work nonce; (iv) a timestamp associated with the committed updates 106A-N in the block; (v) a Merkle root for verifying existence of the committed one of the updates 106A-N in the block; or (vi) a Merkle root for verifying whether the committed one of the updates 106A-N in block was applied to a configuration of a computer program installed on one or more of the devices 102A-N. For this embodiment, the devices 102A-N and/or the entities 104A-N having the ledger 103 can use the block headers to keep track of the entire ledger 103, and request a specific block's transaction tree only when processing operations need to be performed on the ledger 103 (e.g., adding a new block to the ledger 103, etc.). For yet another embodiment, the ledger 103 can be made more resource-efficient by being based on the epoch Slasher technique associated with the light client protocol for the ethereum blockchain.

In some instances, a blockchain synchronization algorithm is required to maintain the ledger 103 across the devices 102A-N and/or the entities 104A-N. Here, the blockchain synchronization algorithm enables nodes of the system 100 (e.g., one or more of the devices 102A-N and/or the entities 104A-N) to perform a process of adding transactions to the ledger 103 and agreeing on the contents of the ledger 103. The blockchain synchronization algorithm allows for one or more of the devices 102A-N and/or the entities 104A-N to use the ledger 103, as a block chain, to distinguish legitimate transactions (i.e., software updates) from attempts to comprise to include false or faulty information by an attacker (e.g., man-in-the-middle attacks, etc.).

Executing the blockchain synchronization algorithm is designed to be resource-intensive so that the individual blocks of the ledger 103 must contain a proof to be considered valid. Examples of proofs include, but are not limited to, a proof of work and a proof of stake. Each block's proof is verified by the devices 102A-N and/or the entities 104A-N when they receive the block. In this way, the blockchain synchronization algorithm assists with allowing the devices 102A-N and/or the entities 104A-N to reach a secure, tamper-resistant consensus. For one embodiment, the blockchain synchronization algorithm is embedded in the system 100 and performed by at least one of the devices 102A-N and/or the entities 104A-N. For example, one or more of the devices 102A-N and/or the entities 104A-N may include an FPGA that is dedicated to performing and executing the blockchain synchronization algorithm. For this example, the FPGA generates the proofs for the blocks to be included in the ledger 103. Also, and for this example, the blocks are added to the ledger 103 only through verification and consensus (as described above). The blockchain synchronization algorithm can be performed by: (i) any of the devices 102A-N and/or the entities 104A-N; or (ii) multiple of the devices 102A-N and/or the entities 104A-N. For a further embodiment, generating proofs for new blocks is performed in response to automatically determining the complexity of the operation given the availability of resources in the system 100. In this way, the resources of system 100 can be utilized more efficiently.

For another embodiment, the blockchain synchronization algorithm is performed outside of the system 100 by, for example, a synchronization device (not shown). This synchronization device can be paired to one or more of the devices 102A-N and/or the entities 104A-N having the ledger 103. For example, one or more of the devices 102A-N may be paired via communication mechanism(s) 105 to a synchronization device outside the system 100. For this example, the synchronization device includes electronic components that are similar to components 130A-N (which are described above). Also, and for this example, each transaction (e.g., a software update, a record of a software update, etc.) is communicated to the synchronization device via the communication mechanism(s) 105 using one or more secure communication techniques. Here, the synchronization device generates the proof required for verification and consensus and communicates it back to the system 100.

For yet another embodiment, the ledger 103 may be maintained across the system 100 without using the blockchain synchronization algorithm. As a first example, the ledger 103 may be implemented as a distributed database. For a second example, the ledger 103 may be maintained across the system 100 as a distributed version control system (DVCS), which is also sometimes known as a distributed revision control system (DVRS). Examples of a DVCS include, but are not limited to, ArX, BitKeeper, Codeville, Dares, DCVS, Fossil, Git, and Veracity.

The ledger 103 can also be made as a combination of the immediately preceding embodiments. For one embodiment, the ledger 103 is implemented with the blockchain synchronization algorithm in response to determining that resources of the system 100 are sufficient for the resource-intensive synchronization process. For this embodiment, the ledger 103 is implemented without the blockchain synchronization algorithm in response to determining that resources of the system 100 are not enough for the synchronization process.

Enabling the devices 102A-N to record the applied ones of updates 106A-N to the ledger 103 and/or enabling the update entities 104A-N to commit updates 106A-N to the ledger 103 can be based on the enhanced privacy identification (EPID) protocol, e.g., the zero proof protocol. For an embodiment based on the zero proof protocol, one or more of the devices 102A-N (e.g., device 102A, etc.) acts as a verifier that determines whether other ones of the devices 102A-N (e.g., devices 102B-N, etc.) and/or one or more update entities 104A-N are members of a group of devices that have been granted the privilege to have their actions processed and added to the blockchain represented as the ledger 103. For this embodiment, each of the devices 102A-N (e.g., devices 102B-N, etc.) and/or the one or more update entities 104A-N that has privilege to access the ledger 103 cryptographically binds its corresponding public-key to the zero-knowledge proof sent to the verifier, resulting in that public-key being recognized as an identity that has obtained permission to perform actions on the blockchain represented as the ledger 103. For one embodiment, the device(s) 102A-N (e.g., device 102A, etc.) acting as the verifier adds the verified public-key to the ledger 103. Thus, the ledger 103 can maintain its own list of devices 102A-N and/or entities 106A-N that can interact with the ledger 103. In this way, the device(s) 102A-N (e.g., device 102A, etc.)

acting as the verifier ensures that any of the devices 102A-N and/or entities 106A-N that writes to the ledger 103 is authorized to do so.

To assist with security, and for one embodiment, the ledger 103 can be accessible to the update entities 104A-N only via public key cryptography. Here, public keys associated with the ledger 103 can be disseminated to the entities 104A-N, on an as-needed basis, with private keys associated with the ledger 103, which would be known only to users of the devices 102A-N. In this way, public key cryptography can be used for two functions: (i) using the public key to authenticate that an update originated with one of the entities 104A-N that is a holder of the paired private key; or (ii) encrypting an update provided by one of the entities 104A-N with the public key to ensure that only users of the devices 102A-N, which would be the holders of the paired private key can decrypt the update. For example, and for one embodiment, the entity 104A cannot commit the update 106A to the ledger 103 unless the entity 104A is granted access to the ledger 103 via public key cryptography and/or unless the entity 104A has been verified via the zero proof protocol described above. While, the public key may be publicly available to the entities 104A-N, a private key and/or prior verification via the zero proof protocol will be necessary to commit the updates 106A to the ledger 103. For this example, the private key can be provided to the entity 104A via the communication mechanism(s) 105 by the logic/module 101A in response to input provided to the device 102A by a user. Based on a combination of public key cryptography and/or the verification via the zero proof protocol, the entity 104A is enabled to commit update 106A to the ledger 103. As shown by the immediately preceding example, only users of devices 102A-N can provide the update entities 104A-N with access to the ledger 103. This has an advantage of minimizing or eliminating the risk of security vulnerabilities (e.g., man-in-the-middle attacks, eavesdropping, unauthorized data modification, denial-of-service attacks, sniffer attacks, identity spoofing, etc.) because the users will always know which ones of entities 104A-N has been granted to their devices 102A-N via the ledger 103. For one embodiment, the private key can include information that grants the update entities 104A-N with access to the ledger 103 for a limited period of time (e.g., 10 minutes, 1 hour, any other time period, etc.). Thus, security is further bolstered by preventing an entity 104A-N from having unfettered access to the devices 102A-N and/or the ledger 103.

To assist with minimizing or eliminating security vulnerabilities, the users of the devices 102A-N can revoke the access granted to any suspicious ones of the entities 104A-N. For example, the logic/module 101A can update the ledger 103 to reflect suspicious ones of the entities 104A-N in response to the logic/module 101A receiving input provided to the device 104A by a user via the communication mechanism(s) 105. In this way, the logic/modules 101A-N can reject any requests for access to the ledger 103 from unauthorized ones of the entities 104A-N. For a further embodiment, the device(s) 102A-N (e.g., device 102A) that act as the verifier can prevent or remove any suspicious devices 102A-N (e.g., device 102B-N) and/or entities 104A-N from the verified group described above. The immediately preceding embodiment can be performed in response to user provided inputs.

Figure 2:
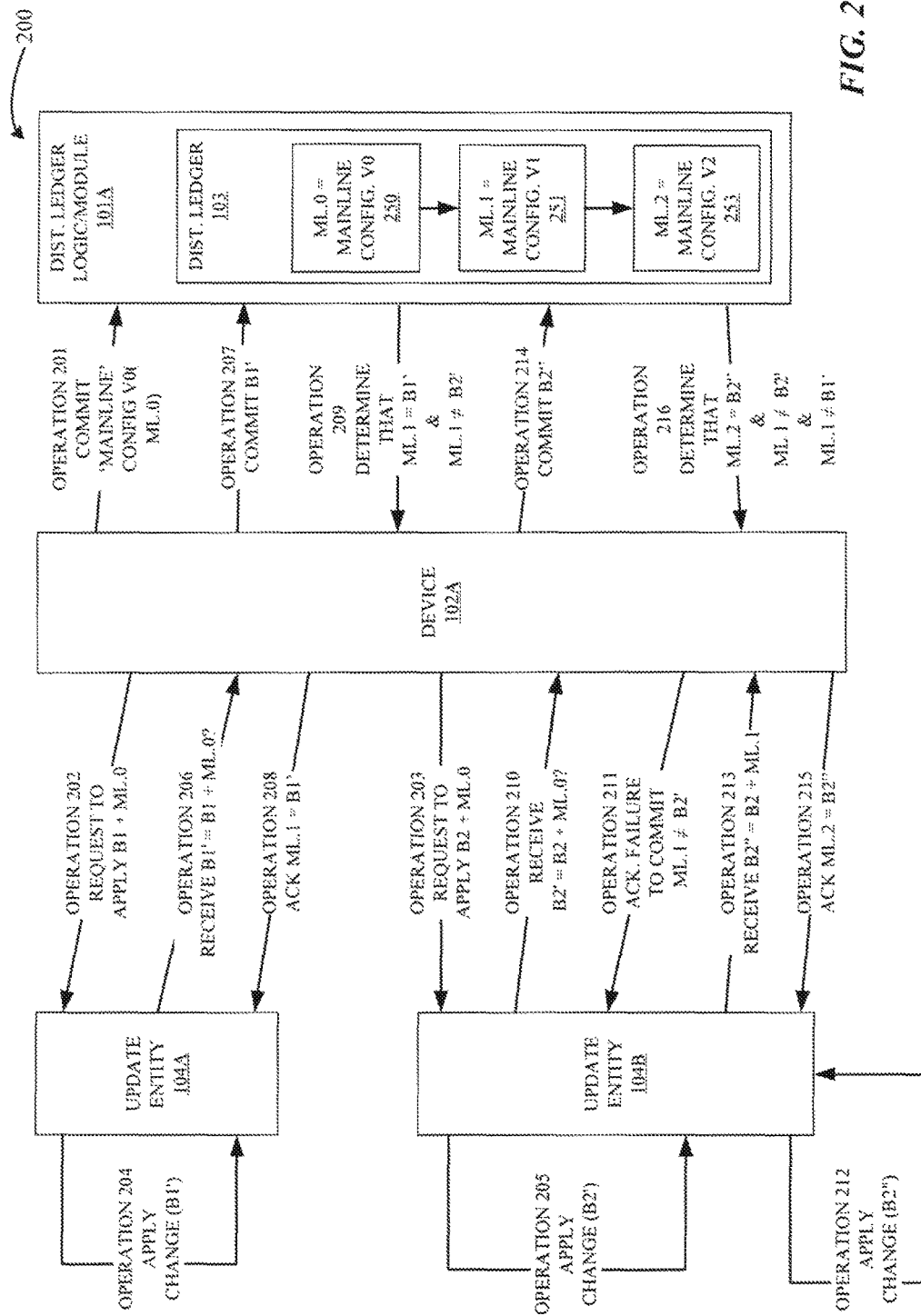
FIG. 2 is a sequence diagram illustrating a technique for updating a computer program installed on one or more interconnected programmable devices according to one embodiment.

FIG. 2 is a sequence diagram illustrating a technique 200 for updating a computer program installed on one or more interconnected programmable devices according to one embodiment. The technique 200 can be performed by one or more elements of the network 100 described above in connection FIG. 1. For example, a processor (e.g., a cryptoprocessor, a TPM-compliant processor, etc.) implementing a distributed ledger module/logic (e.g., the distributed ledger logic/module 101A described above in connection with FIG. 1, etc.). Technique 200 includes some elements of the network 100 described above in connection with FIG. 1. For the sake of brevity, these elements are not described again.

Technique 200 begins at operation 201, where a distributed ledger logic/module performing technique 200 commits a first configuration of a computer program (ML.0) installed on the device 102A to a distributed ledger 103. For one embodiment, the first configuration of a computer program (ML.0) is committed and recorded to a block 250 of the ledger 103. For one embodiment, a corresponding hash and/or digital signature is generated for the block 250, which is provided to copies of the ledger 103 residing on other devices (e.g., devices 102B-N described above in connection with FIG. 1). Next, technique 200 proceeds to operations 202 and 203. Here, an update entity 104A transmits a request to the device 102A regarding a first update (B1) to be applied to the first configuration of a computer program (ML.0). Also, an update entity 104B also transmits a request to the device 102A regarding a second update (B2) to be applied to the first configuration of a computer program (ML.0).

In some scenarios, the multiple update entities 104A-B may cause the device 102A to become improperly updated. This can occur, for example, when the update entity 104A prepares the first update (B1) based on an understanding that the first configuration of the computer program (ML.0) is the current configuration of the computer program installed on the device 102A, while the update entity 104B also prepares the second update (B2) based on an understanding that the first configuration of the computer program (ML.0) is the current configuration of the computer program installed on the device 102A. In such a situation, the update entities 104A-B may race each other to apply their respective updates. Furthermore, even if one of the entities 104A-B successfully applies its updates, the other one entity's update may fail or cause the device 102A to be improperly updated. For one embodiment, the device 102A resolves this issue by posting the updates of the update entities 104A-B to the distributed ledger 103. In this way, the ledger 103 can ensure a winner, and assist with minimizing a failure of device 102A caused by the improper update process described above.

At operation 204, the update entity 104A successfully applies the first update (B1) to the first configuration of the computer program (ML.0) to create a first updated computer program (B1'=B1+ML.0). Furthermore, at operation 205, the update entity 104B attempts to apply the second update (B2) to the first configuration of the computer program (ML.0) to create a non-existent first updated computer program (B2'=B2+ML.0).

Given that operation 204 was successful, the device 102A receives the first updated computer program (B1'=B1+ML.0) from the update entity 104A, as shown in operation 206. For a further embodiment, operation 206 includes the update entity 104A committing the first updated computer program (B1'=B1+ML.0) to the device 102A. Furthermore, the logic/module 101A directs the device 102A to commit the first updated computer program (B1'=B1+ML.0) to the ledger 103, as shown in operation 207. As shown in FIG. 2, the first updated computer program (B1'=B1+ML.0) is recorded in block 251 of the ledger 103 by the logic/module 101A as a second configuration of the computer program (ML.1). At operation 208, the device 102A transmits an acknowledgement that is received by the update entity 104A to indicate that the first updated computer program (B1'=B1+ML.0) was successfully received by the device 102A and/or successfully committed to the ledger 103 as the second configuration of the computer program (ML.1).

With regard to the unsuccessful operation 205, the update entity 104B attempts to commit or transmit the non-existent first updated computer program (B2'=B2+ML.0) to the device 102A, as shown in operation 210. At operation 211, the device 102A transmits an acknowledgement that is received by the update entity 104B to indicate that the non-existent first updated computer program (B2'=B2+ML.0) was not successfully received by and/or installed on the device 102A. Next, in response to operation 209, the device 102A determines that the first configuration of the computer program (ML.0) no longer exists because the ledger 103 includes the second configuration of the computer program (ML.1). This determination can include the distributed ledger logic/module 101A examining the most recent block of the ledger 103 to determine the latest configuration of the computer program. Based on this determination, and at operation 212, the update entity 104B successfully applies the second update (B2) to the second configuration of the computer program (ML.1) to create a second updated computer program (B2"=B2+ML.1). Next, and as shown in operation 213, the device 102A receives the second updated computer program (B2"=B2+ML.1) from the update entity 104B. For a further embodiment, operation 213 includes the update entity 104B committing the second updated computer program (B2"=B2+ML.1) to the device 102A. Furthermore, the logic/module 101A directs the device 102A to commit the second updated computer program (B2"=B2+ML.1) to the ledger 103 as shown in operation 214. The second updated computer program (B2"=B2+ML.1) is recorded in block 253 of the ledger 103 by the logic/module 101A as a third configuration of the computer program (ML.2). At operation 215, the device 102A transmits an acknowledgement that is received by the update entity 104B to indicate that the second updated computer program (B2"=B2+ML.1) was successfully installed on the device 102A and/or successfully committed to the ledger 103 as the third configuration of the computer program (ML.2).

For any additional requests to update the computer program installed on the device 102A, operation 216 can be performed before application of such updates to ensure that the updates are applied to the proper configuration of the computer program. Specifically, the device 102A performs operation 216 to determine that the first configuration of the computer program (ML.0) and the second configuration of the computer program (ML.1) no longer exists because the ledger 103 includes the third configuration of the computer program (ML.2). Technique 200 can assist with allowing updates that include multiple components, firmware, system software, application binaries, application interpreters and/or data model scripts to be updated successfully in situations where these updates are dynamically received from multiple sources.

Figure 3:
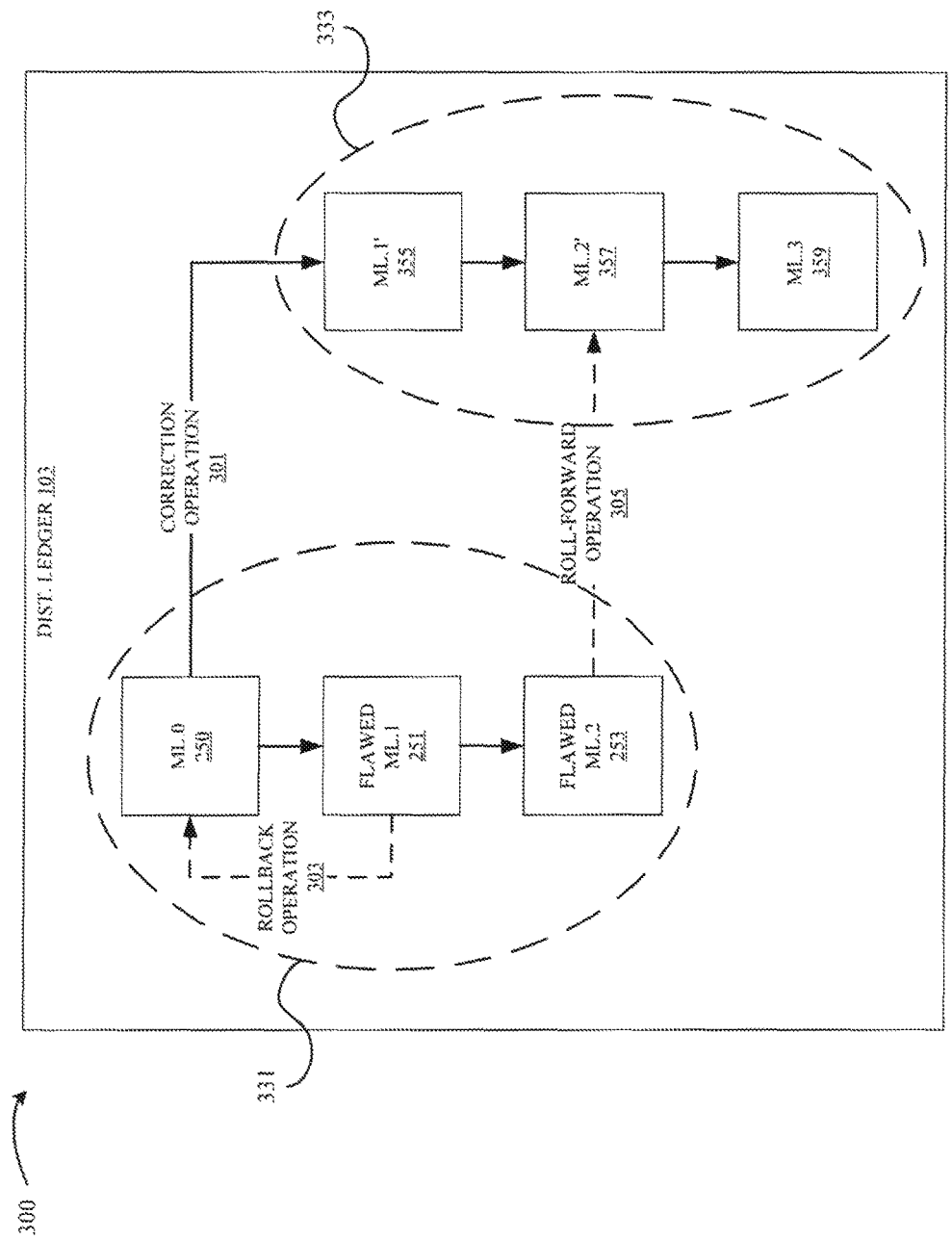
FIG. 3 is a sequence diagram illustrating a technique for updating a computer program using a distributed ledger according to one embodiment.

Referring now to FIG. 3, which is a sequence diagram illustrating a technique 300 for updating a computer program using a distributed ledger 103 in accord with one embodiment. The technique 300 can be performed by one or more elements of the network 100 described above in connection FIG. 1. For example, a processor (e.g., a cryptoprocessor, a TPM-compliant processor, etc.) implementing a distributed ledger module/logic (e.g., the distributed ledger logic/module 101A described above in connection with FIG. 1, etc.). Technique 300 includes some elements of the technique 200 described above in connection with FIG. 2 and some elements of the network 100 described above in connection with FIG. 1. For the sake of brevity, these elements are not described again.

One feature of the distributed ledger 103, which is based on blockchain technology, is the ability to resolve forks attributable to the devices 102A-N and/or the entities 104A-N that have access to the ledger 103 attempting to add blocks to the end of the chain by finding a nonce that produces a valid hash for a given block of data. When two blocks are found that both claim to reference the same previous block, a fork in the chain is created. Some of the devices 102A-N and/or the entities 104A-N in the network 100 will attempt to find the next block on one end of the fork while other ones of the devices 102A-N and/or the entities 104A-N in the network 100 will work from the other end of the fork. Eventually one of the forks will surpass the other in length, and the longest chain is accepted by consensus as the valid chain. This is usually achieved using a consensus algorithm or protocol. Therefore, intruders attempting to change a block must not only re-find a valid hash for each subsequent block, but must do it faster than everyone else working on the currently accepted chain. Thus, after a certain number of blocks have been chained onto a particular block, it becomes a resource-intensive task to falsify contents of a block, which assists with minimizing or eliminating security vulnerabilities. For one embodiment, this ability to resolve forks can be used to ensure that the updates 106A-N are properly applied, especially in situations where rollback operations and roll-forward operations are necessary to deal with problematic updates.

Referring again to FIG. 3, which illustrates two chains 331 and 333. Each of the chains 331 and 333 represents a fork that is created due to a rollback operation 301, correction operation 303, and/or a roll-forward operation 305. Technique 300 can begin when at least one of the logic/modules 101A-N detects or determines that a second configuration of the computer program (ML.1), which is recorded in block 251 of the ledger 103 includes a flaw that affects an operation of the programmable device 102A. Such a flaw can, for example, be the result of applying a faulty update to the first configuration of the computer program (ML.0), as described above. The result of such an application can create a defective second configuration of the computer program (ML.1) that causes one or more of the devices 102A-N of the network 100 to crash or malfunction.

The one or more logic/modules 101A-N can detect a flaw in a configuration of a computer program installed on the devices 102A using one or more software configuration management (SCM) techniques. One example of an SCM technique includes analyzing one or more checksums of software images associated with updating configurations of a computer program installed on the device 102A (e.g., any of updates 106A-N applied to the device 102A, etc.). For this example, the one or more logic/modules 101A-N detect the flaw in the second configuration of the computer program (ML.1) installed on or received by the device 102 by comparing: (i) a first checksum associated with the second configuration (ML.1) received by the device 102A from the update entity 104A; and (ii) a second checksum associated with the second configuration (ML.1) that was transmitted by the update entity 104A to the device 102A. For another example of an SCM technique, a watchdog timing technique and/or a heartbeat timing technique can be used to detect a flaw that results from applying an update to the first configuration of the computer program (ML.0). A watchdog timing technique includes the device 102A periodically resetting a timer before the timer expires to indicate that there are no errors in the operation of the device 102A. When the device 102A does not reset its timer, it is assumed that the operation of device 102A is flawed. Thus, the one or more logic/modules 101A-N can detect the flaw in the second configuration of the computer program (ML.1) installed on device 102A when the one or more logic/modules 101A-N determine that the device 102A failed to reset its timer after application of an update to the first configuration of the computer program (ML.0). A heartbeat timing technique generally includes the device 102A transmitting a heartbeat signal with a payload to another device (e.g., any of devices 102B-N, etc.) in the network (e.g., network 100, etc.) to indicate that the device 102A is operating properly. Thus, one or more logic/modules 101A-N can detect the flaw in the second configuration of the computer program (ML.1) installed on device 102A when the one or more logic/modules 101A-N determine that the device 102A failed to transmit its heartbeat signal on time after application of an update to the first configuration of the computer program (ML.0). The watchdog timing technique and/or the heartbeat timing technique can be implemented in a processor (e.g., fault-tolerant microprocessor, etc.) of the device 102A. For yet another example of an SCM technique, exception handling techniques (e.g., language level features, checking of error codes, etc.) can be used by the logic/module 101A to determine that the second configuration of the computer program (ML.1) installed on device 102A is flawed. For a specific example of an exception handling technique that applies when the device 102A includes or executes a script, the one or more logic/modules 101A-N can determine that the second configuration of the computer program (ML.1) installed on device 102A is flawed when the one or more logic/modules 101A-N determine that the device 102A failed to output or return a result message (e.g., an exit status message, a result value, etc.) to indicate that the script was successfully run or executed after an update was applied to the first configuration of the computer program (ML.0). The one or more logic/modules 101A-N can request the result message from the processor(s) of the device 102A running or executing the script.

The description in the immediately preceding paragraph assumes that the device 102A was operating properly when the first configuration of the computer program (ML.0) was installed on the device 102A and began malfunctioning when the second configuration of the computer program (ML.0) was installed on the device 102A.

In response to detecting the flaw, at least one of the logic/modules 101A-N can perform a rollback operation 301 to return the computer program a previous state—that is, to return the computer program from the defective second configuration (ML.1) recorded in block 251 of the ledger 103 to the properly functioning first configuration (ML.0) recorded in block 250 of the ledger 103. The rollback operation 301 can assist with restoring a computer program installed on the device 102A to a previously known configuration that was functioning properly. This is important in situations where the actual effect of an update may be unknown or speculative, which could result in a configuration of the computer program that is in an inconsistent state.

Next, the technique 300 proceeds to a correction operation 301. Here, at least one of the logic/modules 101A-N performs the correction operation 301 to correct the detected flaw, such that updating the first configuration of the computer program (ML.0) to a later configuration will not create unwanted effects. Specifically, the flaw is corrected such that the first configuration of the computer program (ML.0) recorded in block 250 of the ledger 103 is updated to a second corrected configuration of the computer program (ML.1') recorded in block 355 of the ledger 103. This creates a fork in the ledger 103 that creates the chain 333. For an embodiment, updates continue to be applied to the blocks 251 and the blocks 355 of the ledger 103. In this way, each of the chains 331 and 333 continues to grow.

For one embodiment, the same update is applied to the configurations of the computer program recorded in blocks 251 and 355 to create the updated configurations of the computer program recorded in blocks 253 and 357, respectively. Also, at least one of the logic/modules 101A-N can determine that the configuration of the computer program recorded in block 251 is flawed. Next, at least one of the logic/modules 101A-N can perform a roll-forward operation 305 to replace the flawed configuration recorded in block 251 with the properly functioning configuration of the computer program recorded in block 357 of chain 333. Consequently, the chain 331 becomes shorter than the chain 333. Thus, a plurality of the logic/modules 101A-N would agree, based on a consensus algorithm or protocol, that the chain 333 is the valid chain. In this way, issues associated with faulty updates can be rectified using the distributed ledger 103. An advantage of this embodiment is that faulty updates can be removed from the network 100 based on the blocks of the distributed ledger 103, such that all of the devices 102A-N can eventually eliminate any faulty configurations of computer programs as they reach a consensus of which configurations are good ones.

Detecting flaws in the configurations of the computer program may occur as a result of audits, forensics or other investigation of configurations installed on the devices 102A-N or found on the ledger 103. For one embodiment, the one or more logic/modules 101A-N used to perform technique 300 can reside in any one of devices 102A-N in the network 100 or in a TREE of a processor of one or more of the devices 102A-N that may execute independently of the device(s) 102A-N.

For one embodiment, the configurations of the computer program recorded in blocks 250, 251, 253, 355, 357, and 359 of the ledger 103 are maintained in bundles in order to keep versioning simple. That is, each bundle representing one of the configurations of the computer program recorded in blocks 250, 251, 253, 355, 357, and 359 of the ledger 103 contains all the packages, files and other dependencies that may be implicated when performing an update. For one embodiment, a bundle version string is used by the one or more logic/modules 101A-N to track the first configuration of the computer program and any subsequent updates applied to the first configuration that result in one or more later configurations of the computer program. One benefit of bundles is that each file in a bundle has an integrity hash that can be compared with the installed file hash, which can assist with improving update speed.

Figure 4:
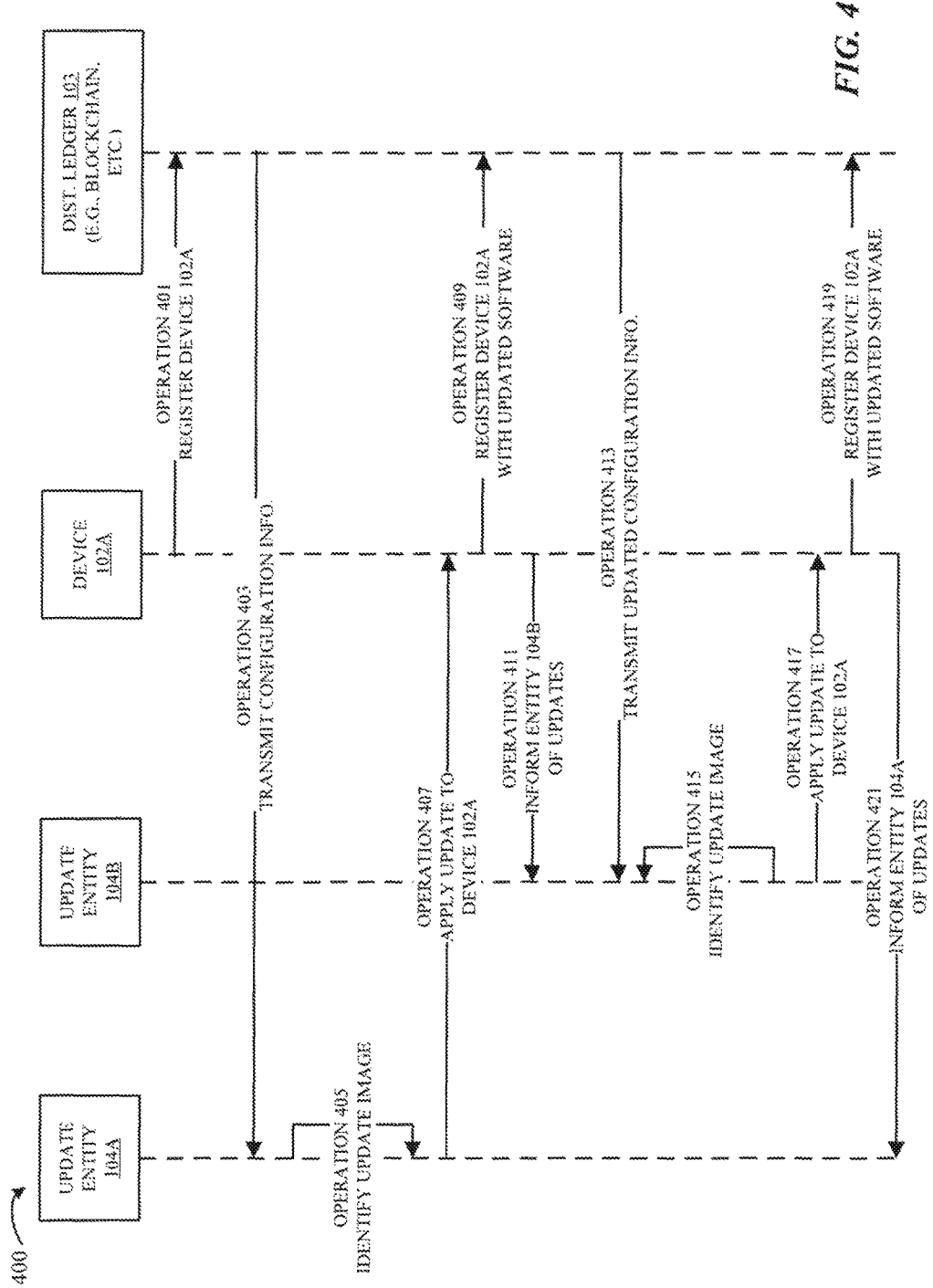
FIG. 4 is a sequence diagram illustrating a technique for updating a computer program using a distributed ledger according to another embodiment.

With regard now to FIG. 4, which is a sequence diagram illustrating a technique 400 for updating a computer program installed on programmable device 102A using a distributed ledger 103 according to another embodiment. The technique 400 can be performed by one or more elements of the network 100 described above in connection FIG. 1. For example, a processor (e.g., a cryptoprocessor, a TPM-compliant processor, etc.) implementing a distributed ledger module/logic (e.g., the distributed ledger logic/module 101A described above in connection with FIG. 1, etc.). Technique 400 includes some elements of the techniques 200 and 300 described above in connection with FIGS. 2 and 3, as well as, some elements of the network 100 described above in connection with FIG. 1. For the sake of brevity, these elements are not described again.

A distributed ledger module/logic (e.g., one or more of the logic/modules 101A-N) may perform the technique 400 when the update entities 104A-B and the device 102A have a contract to manage updates. For one embodiment, each contract can be a smart contract—that is, a state stored in the blockchain represented as the distributed ledger 103 that facilitates, authenticates, and/or enforces performance of a contract between the update entities 104A-B and the device 102A. Consequently, a smart contract is one feature of the ledger 103, as a blockchain, that can assist the one or more distributed ledger modules/logic 101A-N with keeping track of a current configuration of a computer program installed on the device 102A. This is beneficial because a smart contract can enable the ledger 103 to remain stable, even as account servicing roles are transferred or passed between the update entities 104A-B. Technique 400, as described below and in connection with FIG. 4, presents an example smart contract that delineates the order of transmitting or applying updates by the update entities 104A-B to computer programs installed on the device 102A.

Technique 400 begins at operation 401, where a distributed ledger module/logic registers the device 102A with the ledger 103. This can be performed by creating a genesis block (when the ledger 103 lacks any blocks) or appending a block to an already existing ledger 103. For one embodiment, a distributed ledger module/logic registers the device 102A with the ledger 103 by committing the current configuration of the computer program installed on the device 102A to the ledger 103. At operation 403, a distributed ledger module/logic performing the technique 400 transmits the current configuration of the computer program installed on the device 102A to an update entity 104A. Operation 403 can, for one embodiment, be performed in response to the update entity 104A requesting application of an update to the current configuration of the computer program. At operations 405 and 407, the update entity 104A can identify the proper update and apply the identified update to the current configuration of the computer program received from the device 102A to generate a first updated configuration of the computer program. Operation 407 can, for one embodiment, include the distributed ledger module/logic performing the technique 400 causing the device 102A to receive the first updated configuration from the update entity 407A. For a further embodiment, operation 407 can include the distributed ledger module/logic performing the technique 400 causing the device 102A to commit the first updated configuration to the device 102A.

A distributed ledger module/logic performing the technique 400 can, at operation 409, register the device 102A with its first updated configuration of the computer program. Similar, to operation 401, registering the device 102A with its first updated configuration of the computer program includes creating a block to record the first updated configuration of the computer program and committing the first updated configuration to the ledger 103. Furthermore, the distributed ledger module/logic performing the technique 400 can, at operation 411, inform the update entity 104B that the update entity 104A applied updates to the current configuration of the computer program installed on the device 102A. After operation 411, the distributed ledger module/logic performing the technique 400 transmits its first updated configuration of the computer program based on the most current block of the ledger 103 in operation 413. At operations 415 and 417, the update entity 104B can identify the proper update and apply the identified update to the first updated configuration of the computer program received from the device 102A to generate a second updated configuration of the computer program. Operation 417 can, for one embodiment, include the distributed ledger module/logic performing the technique 400 causing the device 102A to receive the second updated configuration from the update entity 407B. For a further embodiment, operation 417 can include the distributed ledger module/logic performing the technique 400 causing the device 102A to commit the second updated configuration to the device 102A. Next, at operation 419, a distributed ledger module/logic performing the technique 400 can register the device 102A with its second updated configuration of the computer program. Similar, to operations 401 and 409, registering the device 102A with its second updated configuration includes creating a block to record the second updated configuration of the computer program and committing the second updated configuration to the ledger 103. Furthermore, the distributed ledger module/logic performing the technique 400 can, at operation 421, inform the update entity 104A that the update entity 104B applied updates to the first updated configuration of the computer program installed on the device 102A. In this way, other updates can be applied by the entity 104A (if desired).

Figure 5:
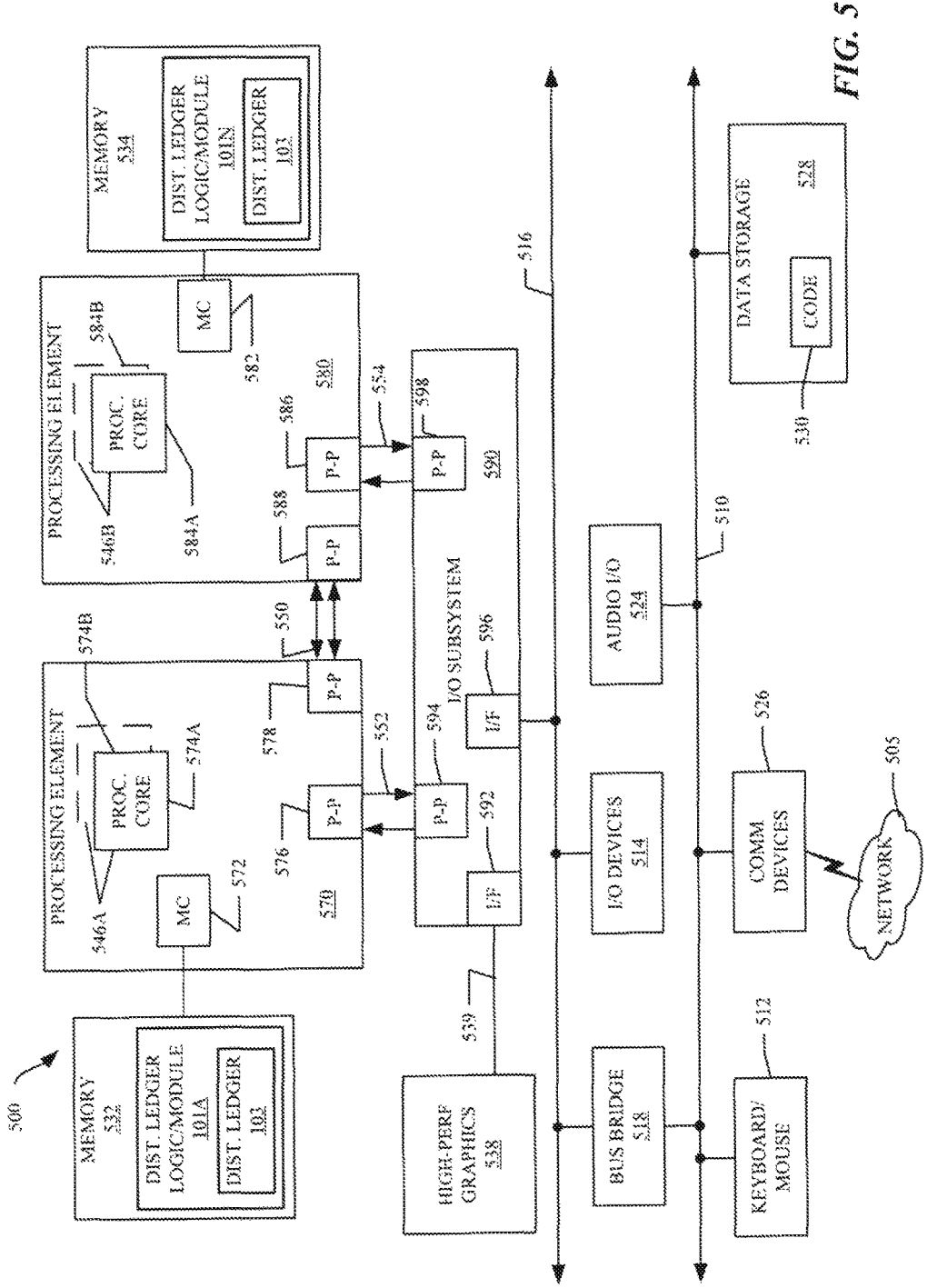
FIG. 5 is a block diagram illustrating a programmable device for use with techniques described herein according to one embodiment.

FIG. 5 is a block diagram that illustrates a programmable device 500, which may be used to implement the techniques described herein in accordance with one or more embodiments (e.g., network 100 and techniques 200, 300, and 400). The programmable device 500 illustrated in FIG. 5 is a multiprocessor programmable device that includes a first processing element 570 and a second processing element 580. While two processing elements 570 and 580 are shown, an embodiment of programmable device 500 may also include only one such processing element.

Programmable device 500 is illustrated as a point-to-point interconnect system, in which the first processing element 570 and second processing element 580 are coupled via a point-to-point interconnect 550. Any or all of the interconnects illustrated in FIG. 5 may be implemented as a multi-drop bus rather than point-to-point interconnects.

As illustrated in FIG. 5, each of processing elements 570 and 580 may be multicore processors, including first and second processor cores (i.e., processor cores 574A and 574B and processor cores 584A and 784B). Such cores 574A, 574B, 584A, 584B may be configured to execute computing instruction code. However, other embodiments may use processing elements that are single core processors as desired. In embodiments with multiple processing elements 570, 580, each processing element may be implemented with different numbers of cores as desired.

Each processing element 570, 580 may include at least one shared cache 546. The shared cache 546A, 546B may store data (e.g., computing instructions) that are utilized by one or more components of the processing element, such as the cores 574A, 574B and 584A, 584B, respectively. For example, the shared cache may locally cache data stored in a memory 532, 534 for faster access by components of the processing elements 570, 580. For one or more embodiments, the shared cache 546A, 546B may include one or more mid-level caches, such as level 2 (L2), level 3 (L3), level 4 (L4), or other levels of cache, a last level cache (LLC), or combinations thereof. The memory 532, 534 may include software instructions representing distributed ledger logic/modules 101A-N, which includes a distributed ledger 103 that is accessible by each of the processing elements 570 and 580. Each of the logic/modules 101A-N and the distributed ledger 103 is described above in connection with at least FIG. 1, 2, 3, or 4.

While FIG. 5 illustrates a programmable device with two processing elements 570, 580 for clarity of the drawing, the scope of the present invention is not so limited and any number of processing elements may be present. Alternatively, one or more of processing elements 570, 580 may be an element other than a processor, such as an graphics processing unit (GPU), a digital signal processing (DSP) unit, a field programmable gate array, or any other programmable processing element. Processing element 580 may be heterogeneous or asymmetric to processing element 570. There may be a variety of differences between processing elements 570, 580 in terms of a spectrum of metrics of merit including architectural, microarchitectural, thermal, power consumption characteristics, and the like. These differences may effectively manifest themselves as asymmetry and heterogeneity amongst processing elements 570, 580. In some embodiments, the various processing elements 570, 580 may reside in the same die package.

First processing element 570 may further include memory controller logic (MC) 572 and point-to-point (P-P) interconnects 576 and 578. Similarly, second processing element 580 may include a MC 582 and P-P interconnects 586 and 588. As illustrated in FIG. 5, MCs 572 and 582 couple processing elements 570, 580 to respective memories, namely a memory 532 and a memory 534, which may be portions of main memory locally attached to the respective processors. While MC logic 572 and 582 is illustrated as integrated into processing elements 570, 580, in some embodiments the memory controller logic may be discrete logic outside processing elements 570, 580 rather than integrated therein.

Processing element 570 and processing element 580 may be coupled to an I/O subsystem 590 via respective P-P interconnects 576 and 586 through links 552 and 554. As illustrated in FIG. 5, I/O subsystem 590 includes P-P interconnects 594 and 598. Furthermore, I/O subsystem 590 includes an interface 592 to couple I/O subsystem 590 with a high performance graphics engine 538. In one embodiment, a bus (not shown) may be used to couple graphics engine 538 to I/O subsystem 590. Alternately, a point-to-point interconnect 539 may couple these components.

In turn, I/O subsystem 590 may be coupled to a first link 516 via an interface 596. In one embodiment, first link 516 may be a Peripheral Component Interconnect (PCI) bus, or a bus such as a PCI Express bus or another I/O interconnect bus, although the scope of the present invention is not so limited.

As illustrated in FIG. 5, various I/O devices 514, 524 may be coupled to first link 516, along with a bridge 518 that may couple first link 516 to a second link 520. In one embodiment, second link 520 may be a low pin count (LPC) bus. Various devices may be coupled to second link 720 including, for example, a keyboard/mouse 512, communication device(s) 526 (which may in turn be in communication with the computer network 503), and a data storage unit 528 such as a disk drive or other mass storage device which may include code 530, for one embodiment. The code 730 may include instructions for performing embodiments of one or more of the techniques described above. Further, an audio I/O 524 may be coupled to second link 520.

Note that other embodiments are contemplated. For example, instead of the point-to-point architecture of FIG. 5, a system may implement a multi-drop bus or another such communication topology. Although links 516 and 520 are illustrated as busses in FIG. 5, any desired type of link may be used. In addition, the elements of FIG. 5 may alternatively be partitioned using more or fewer integrated chips than illustrated in FIG. 5.

Figure 6:
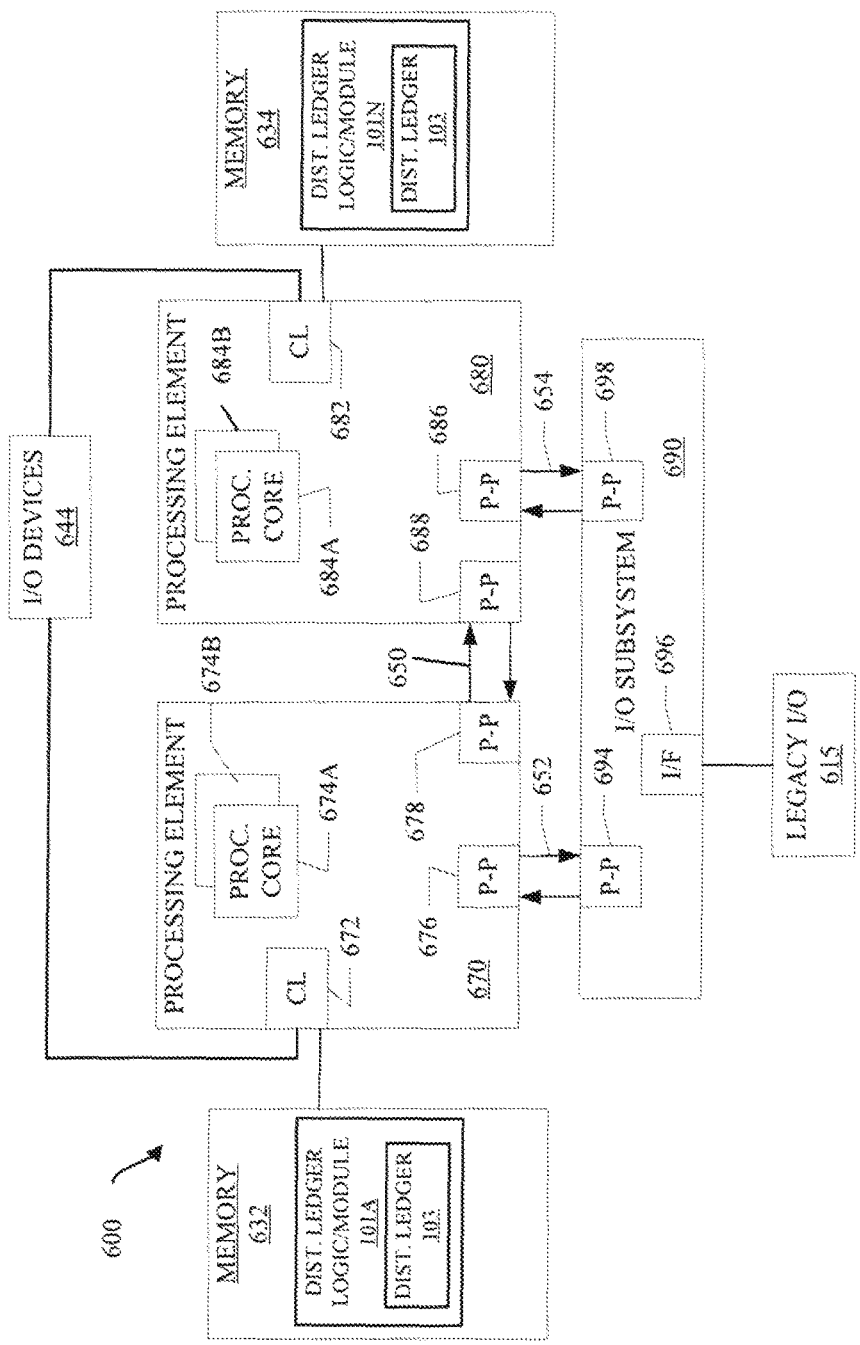
FIG. 6 is a block diagram illustrating a programmable device for use with techniques described herein according to another embodiment.

FIG. 6 is a block diagram illustrating a programmable device 600 for use with techniques described herein according to another embodiment. Certain aspects of FIG. 6 have been omitted from FIG. 6 in order to avoid obscuring other aspects of FIG. 6.

FIG. 6 illustrates that processing elements 670, 680 may include integrated memory and I/O control logic ("CL") 672 and 682, respectively. In some embodiments, the 672, 682 may include memory control logic (MC) such as that described above in connection with FIG. 6. In addition, CL 672, 682 may also include I/O control logic. FIG. 6 illustrates that not only may the memories 632, 634 be coupled to the CL 672, 682, but also that I/O devices 644 may also be coupled to the control logic 672, 682. Legacy I/O devices 615 may be coupled to the I/O subsystem 690 by interface 696. Each processing element 670, 680 may include multiple processor cores, illustrated in FIG. 6 as processor cores 674A, 674B, 684A and 684B. As illustrated in FIG. 6, I/O subsystem 690 includes point-to-point (P-P) interconnects 694 and 698 that connect to P-P interconnects 676 and 686 of the processing elements 670 and 680 with links 652 and 654. Processing elements 670 and 680 may also be interconnected by link 650 and interconnects 678 and 688, respectively. The memory 632, 634 may include software instructions representing distributed ledger logic/modules 101A-N, which includes a distributed ledger 103, that is accessible and/or executable by each of the processing elements 670 and 680. Each of the logic/modules 101A-N and the distributed ledger 103 is described above in connection with at least FIG. 1, 2, 3, or 4.

The programmable devices depicted in FIGS. 5 and 6 are schematic illustrations of embodiments of programmable devices that may be utilized to implement various embodiments discussed herein. Various components of the programmable devices depicted in FIGS. 5 and 6 may be combined in a system-on-a-chip (SoC) architecture.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product that may include a machine readable medium having stored thereon instructions that may be used to program a processing system or other device to perform the methods. The term "machine readable medium" used herein shall include any medium that is capable of storing or encoding a sequence of instructions for execution by the machine and that cause the machine to perform any one of the methods described herein. The term "machine readable medium" shall accordingly include, but not be limited to, tangible, non-transitory memories such as solid-state memories, optical and magnetic disks. Furthermore, it is common in the art to speak of software, in one form or another (e.g., program, procedure, process, application, module, logic, and so on) as taking an action or causing a result. Such expressions are merely a shorthand way of stating that the execution of the software by a processing system causes the processor to perform an action or produce a result.

At least one embodiment is disclosed and variations, combinations, and/or modifications of the embodiment(s)

and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). The use of the term "about" means±10% of the subsequent number, unless otherwise stated.

Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure.

The following examples pertain to further embodiments.

Example 1 is a non-transitory machine readable medium storing instructions for managing updating of a programmable device that is part of a computer network comprised of multiple interconnected programmable devices, the instructions when executed by a machine cause the machine to: commit, to a distributed ledger, a first configuration of a computer program installed on a programmable device, wherein the programmable device is part of a computer network comprised of multiple interconnected programmable devices, and wherein the distributed ledger exists on at least two of the multiple interconnected programmable devices; receive a first request to apply a first update to the first configuration of the computer program and a second request to apply a second update to the first configuration of the computer program; receive a second configuration of the computer program, the second configuration being generated based on the first update and the first configuration of the computer program; commit the second configuration of the computer program to the distributed ledger; determine, based on the distributed ledger, that the second update cannot be applied to the first configuration of the computer program; receive a third configuration of the computer program in response to determining that the second update cannot be applied, the third configuration being generated based on the second update and the second configuration of the computer program; and commit the third configuration of the computer program to the distributed ledger.

In Example 2, the subject matter of example 1 can optionally include that at least one of the first or second updates is received from a third party updating service.

In Example 3, the subject matter of examples 1 or 2 can optionally include that the second request is received before receiving the second configuration of the computer program.

In Example 4, the subject matter of examples 1, 2, or 3 can optionally include that the distributed ledger stores each configuration of the computer program in a separate block.

In Example 5, the subject matter of examples 1, 2, 3, or 4 can optionally include that each of the first and second updates is a software bundle.

In Example 6, the subject matter of examples 1, 2, 3, 4, or 5 can optionally include that each of the first and second updates is identified using a bundle version string.

In Example 7, the subject matter of examples 1, 2, 3, 4, 5, or 6 can further comprise instructions that when executed by a machine cause the machine to: detect that the second configuration of the computer program should be rolled back; roll back the second configuration of the computer program to the first configuration of the computer program in response to detecting that the second configuration of the computer program should be rolled back; modify the first update in response to rolling back the second configuration of the computer program; receive a modified second configuration of the computer program that is based on the modified first update and the first configuration of the computer program; commit the modified second configuration of the computer program to the distributed ledger; receive a modified third configuration of the computer program that is based on the second update and the modified second configuration of the computer program; and commit the modified third configuration of the computer program to the distributed ledger.

In Example 8, the subject matter of examples 1, 2, 3, 4, 5, 6, or 7 can optionally include that the instructions for causing the machine to modify the first update comprise instructions for causing the machine to: detect a flaw in the first update; and correct the flaw to generate the modified first update.

Example 9 is a method of managing updating of a programmable device that is part of a computer network comprised of multiple interconnected programmable devices, the method comprising: committing, to a distributed ledger implemented by one or more processors of a programmable device, a first configuration of a computer program installed on a programmable device, wherein the programmable device is part of a computer network comprised of multiple interconnected programmable devices, and wherein the distributed ledger exists on at least two of the multiple interconnected programmable devices; receiving, by the one or more processors of the programmable device, a first request to apply a first update to the first configuration of the computer program and a second request to apply a second update to the first configuration of the computer program; receiving a second configuration of the computer program that is based on the first update and the first configuration of the computer program to generate; committing, by the one or more processors of the programmable device, the second configuration of the computer program to the distributed ledger; determining, based on the distributed ledger, that the second update cannot be applied to the first configuration of the computer program; receiving a third configuration of the computer program in response to determining that the second update cannot be applied, the third configuration being generated based on the second update and the second configuration of the computer program; and committing, by the one or more processors of the programmable device, the third configuration of the computer program to the distributed ledger.

In Example 10, the subject matter of example 9 can optionally include that at least one of the first or second updates is received from a third party updating service.

In Example 11, the subject matter of examples 9 or 10 can optionally include that the second request is received before receiving the second configuration of the computer program.

In Example 12, the subject matter of examples 9, 10, or 11 can optionally include that the distributed ledger stores each configuration of the computer program in a separate block.

In Example 13, the subject matter of examples 9, 10, 11, or 12 can optionally include that each of the first and second updates is a software bundle.

In Example 14, the subject matter of examples 9, 10, 11, 12, or 13 can optionally include that each of the first and second updates is identified using a bundle version string.

In Example 15, the subject matter of examples 9, 10, 11, 12, 13, or 14 can optionally further comprise: detecting that the second configuration of the computer program should be rolled back; rolling back the second configuration of the computer program to the first configuration of the computer program in response to detecting that the second configuration of the computer program should be rolled back; modifying the first update in response to rolling back the second configuration of the computer program; receiving a modified second configuration of the computer program that is based on the modified first update and the first configuration of the computer program; committing the modified second configuration of the computer program to the distributed ledger; receiving a modified third configuration of the computer program that is based on the second update and the modified second configuration of the computer program; and committing the modified third configuration of the computer program to the distributed ledger.

In Example 16, the subject matter of examples 9, 10, 11, 12, 13, 14, or 15 can optionally include that modifying the first update comprises: detecting a flaw in the first update; and correcting the flaw to generate the modified first update.

Example 17 is a system for managing updating of a programmable device that is part of a computer network comprised of multiple interconnected programmable devices, the system comprising: one or more processors; and a memory coupled to the one or more processors and storing instructions, wherein execution of the instruction by the one or more processors causes the one or more processors to: commit, to a distributed ledger, a first configuration of a computer program installed on a programmable device, wherein the programmable device is part of a computer network comprised of multiple interconnected programmable devices, and wherein the distributed ledger exists on at least two of the multiple interconnected programmable devices; receive a first request to apply a first update to the first configuration of the computer program and a second request to apply a second update to the first configuration of the computer program; receive a second configuration of the computer program, the second configuration being generated based on the first update and the first configuration of the computer program; commit the second configuration of the computer program to the distributed ledger; determine, based on the distributed ledger, that the second update cannot be applied to the first configuration of the computer program; receive a third configuration of the computer program in response to determining that the second update cannot be applied, the third configuration being generated based on the second update and the second configuration of the computer program; and commit the third configuration of the computer program to the distributed ledger.

In Example 18, the subject matter of example 17 can optionally include that at least one of the first or second updates is received from a third party updating service.

In Example 19, the subject matter of examples 17 or 18 can optionally include that the second request is received before receiving the second configuration of the computer program.

In Example 20, the subject matter of examples 17, 18, or 19 can optionally include that the distributed ledger stores each configuration of the computer program in a separate block.

In Example 21, the subject matter of examples 17, 18, 19, or 20 can optionally include that each of the first and second updates is a software bundle.

In Example 22, the subject matter of examples 17, 18, 19, 20, or 21 can optionally include that each of the first and second updates is identified using a bundle version string.

In Example 23, the subject matter of examples 17, 18, 19, 20, 21, or 22 can optionally further comprise instructions that when executed by the one or more processors causes the one or more processors to: detect that the second configuration of the computer program should be rolled back; roll back the second configuration of the computer program to the first configuration of the computer program in response to detecting that the second configuration of the computer program should be rolled back; modify the first update in response to rolling back the second configuration of the computer program; receive a modified second configuration of the computer program that is based on the modified first update and the first configuration of the computer program; commit the modified second configuration of the computer program to the distributed ledger; receive a modified third configuration of the computer program that is based on the second update and the modified second configuration of the computer program; and commit the modified third configuration of the computer program to the distributed ledger.

In Example 24, the subject matter of examples 17, 18, 19, 20, 21, 22, or 23 can optionally include that the instructions for causing the one or more processors to modify the first update comprise instructions for causing the one or more processors to: detect a flaw in the first update; and correct the flaw to generate the modified first update.

In Example 25, the subject matter of examples 17, 18, 19, 20, 21, 22, 23, or 24 can optionally include that at least one of the one or more processors is a cryptoprocessor.

In Example 26, the subject matter of examples 1, 2, 3, 4, 5, 6, 7, or 8 can optionally include that at least one of the one or more processors of the programmable device is a cryptoprocessor.

In Example 27, the subject matter of examples 9, 10, 11, 12, 13, 14, 15, or 16 can optionally include that at least one of the one or more processors of the programmable device is a cryptoprocessor.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

In this document, reference has been made to blockchain technologies, such as ethereum and bitcoin. ETHEREUM may be a trademark of the Ethereum Foundation (Stiftung Ethereum). BITCOIN may be a trademark of the Bitcoin Foundation. These and any other marks referenced herein may be common law or registered trademarks of third parties affiliated or unaffiliated with the applicant or the assignee. Use of these marks is by way of example and shall not be construed as descriptive or to limit the scope of the embodiments described herein to material associated only with such marks.

What is claimed is:

1. A machine readable solid-state memory or optical disk or magnetic disk comprising instructions for managing updating of a programmable device that is part of a computer network including multiple interconnected programmable devices, wherein the instructions, when executed by at least one processor of the programmable device, cause the at least one processor to at least:

commit, to a distributed ledger, a first configuration of a computer program installed on the programmable device, wherein the distributed ledger exists on at least two of the multiple interconnected programmable devices, and the distributed ledger is based on a blockchain;

receive a first request to apply a first update to the first configuration of the computer program and a second request to apply a second update to the first configuration of the computer program;

generate a second configuration of the computer program, based on the first update and the first configuration of the computer program;

commit the second configuration of the computer program to the programmable device;

commit the second configuration of the computer program to the distributed ledger;

determine a latest configuration of the computer program by examining a most recent block of the distributed ledger;

verify a non-existent status of the first configuration of the computer program on the distributed ledger based on the latest configuration;

prevent the second update from being applied to the first configuration of the computer program;

in response to verifying the non-existent status of the first configuration of the computer program on the distributed ledger, generate a third configuration of the computer program based on the verification, the third configuration to be generated based on the second update and the second configuration of the computer program; commit the third configuration of the computer program to the programmable device; and commit the third configuration of the computer program to the distributed ledger.

2. The machine readable solid-state memory or optical disk or magnetic disk of claim 1, wherein at least one of the first update or the second update is to be received from a third party updating service.

3. The machine readable solid-state memory or optical disk or magnetic disk of claim 1, wherein the second request is to be received before the generating of the second configuration of the computer program.

4. The machine readable solid-state memory or optical disk or magnetic disk of claim 1, wherein the first configuration, the second configuration, and the third configuration are to be stored in the distributed ledger.

5. The machine readable solid-state memory or optical disk or magnetic disk of claim 4, wherein each of the first update and the second update includes a software bundle.

6. The machine readable solid-state memory or optical disk or magnetic disk of claim 5, wherein the instructions, when executed, further cause the at least one processor to identify each of the first update and the second update using a bundle version string.

7. The machine readable solid-state memory or optical disk or magnetic disk of claim 1, further comprising instructions that when executed by the machine wherein the instructions, when executed, further cause the at least one processor to:

detect that the second configuration of the computer program should be rolled back from the programmable device;

roll back the second configuration of the computer program to the first configuration of the computer program in response to detecting that the second configuration of the computer program should be rolled back;

modify the first update in response to rolling back the second configuration of the computer program;

generate a modified second configuration of the computer program based on the modified first update and the first configuration of the computer program;

commit the modified second configuration of the computer program to the distributed ledger;

generate a fourth configuration of the computer program based on the second update and the modified second configuration of the computer program; and commit the fourth configuration of the computer program to the distributed ledger.

8. The machine readable solid-state memory or optical disk or magnetic disk storage device of claim 7, wherein the instructions, when executed, further cause the at least one processor to: detect a flaw in the first update; and correct the flaw to generate the modified first update.

9. The machine readable solid-state memory or optical disk or magnetic disk of claim 1, wherein the instructions, when executed, further cause the at least one processor to validate the committing of the second configuration to the distributed ledger based on a proof-of-work protocol implemented by a public consensus protocol.

10. A method of managing updating of a programmable device that is part of a computer network including comprised of multiple interconnected programmable devices, the method comprising:

committing, by executing an instruction with a processor, a first configuration of a computer program installed on the programmable device to a distributed ledger, wherein the distributed ledger exists on at least two of the multiple interconnected programmable devices and the distributed ledger is based on a blockchain;

analyzing, by executing an instruction with the processor, a first request to apply a first update to the first configuration of the computer program and a second request to apply a second update to the first configuration of the computer program;

generating, by executing an instruction with the processor, a second configuration of the computer program that is based on the first update and the first configuration of the computer program;

committing, by executing an instruction with the processor, the second configuration of the computer program to the programmable device;

committing, by executing an instruction with the processor the one or more processors of the programmable device, the second configuration of the computer program to the distributed ledger;

determining, by executing an instruction with the processor, a latest configuration of the computer program by examining a most recent block of the distributed ledger;

verifying, by executing an instruction with the processor, a non-existent status of the first configuration of the computer program on the distributed ledger based on the latest configuration;

preventing, by executing an instruction with the processor, the second update from being applied to the first configuration of the computer program;

in response to verifying the non-existent status of the first configuration of the computer program on the distributed ledger, generating, by executing an instruction with the processor, a third configuration of the computer program based on the second update and the second configuration of the computer program;

committing, by executing an instruction with the processor, the third configuration of the computer program to the programmable device; and committing, by executing an instruction with the processor the one or more processors of the programmable device, the third configuration of the computer program to the distributed ledger.

11. The method of claim 10, further including receiving at least one of the first update or the second update from a third party updating service.

12. The method of claim 10, further including receiving the second request before receiving the second configuration of the computer program.

13. The method of claim 10, wherein the first configuration, the second configuration, and the third configuration are to be stored in the distributed ledger in a separate block.

14. The method of claim 13, wherein each of the first update and the second update includes a software bundle.

15. The method of claim 14, further including identifying each of the first update and the second update using a bundle version string.

16. The method of claim 10, further including: detecting that the second configuration of the computer program should be rolled back from the programmable device;

rolling back the second configuration of the computer program to the first configuration of the computer program in response to detecting that the second configuration of the computer program should be rolled back;

modifying the first update in response to rolling back the second configuration of the computer program;

generating a modified second configuration of the computer program based on the modified first update and the first configuration of the computer program;

committing the modified second configuration of the computer program to the distributed ledger;

generating a fourth configuration of the computer program based on the second update and the modified second configuration of the computer program; and committing the fourth configuration of the computer program to the distributed ledger.

17. The method of claim 16, further including: detecting a flaw in the first update; and correcting the flaw to generate the modified first update.

18. A system for managing updating of a programmable device that is part of a computer network including multiple interconnected programmable devices, the system comprising: at least one processor; and a memory communicatively coupled to the at least one processor and including instructions, which, when executed, cause the at least one processor to at least:

commit, to a distributed ledger, a first configuration of a computer program installed on the programmable device, wherein the distributed ledger exists on at least two of the multiple interconnected programmable devices and the distributed ledger is based on a blockchain;

analyze a first request to apply a first update to the first configuration of the computer program and a second request to apply a second update to the first configuration of the computer program;

generate a second configuration of the computer program, based on the first update and the first configuration of the computer program;

commit the second configuration of the computer program to the programmable device;

commit the second configuration of the computer program to the distributed ledger;

determine a latest configuration of the computer program by examining a most recent block of the distributed ledger;

verify a non-existent status of the first configuration of the computer program on the distributed ledger based on the latest configuration;

prevent the second update from being applied to the first configuration of the computer program;

in response to verifying the non-existent status of the first configuration of the computer program on the distributed ledger, generate a third configuration of the computer program based on the verification, the third configuration to be generated based on the second update and the second configuration of the computer program;

commit the third configuration of the computer program to the programmable device;

commit the third configuration of the computer program to the distributed ledger; and synchronize the distributed ledger with the second programmable device based on the committing of the third configuration to the distributed ledger.

19. The system of claim 18, wherein at least one of the first update or the second update is to be received from a third party updating service.

20. The system of claim 18, wherein the second request is to be received before the generating of the second configuration of the computer program.

21. The system of claim 18, wherein the first configuration, the second configuration, and the third configuration are to be stored in the distributed ledger in a separate block.

22. The system of claim 21, wherein each of the first update and the second update includes a software bundle.

23. The system of claim 22, wherein the instructions, when executed, further cause the at least one processor to identify each of the first update and the second update using a bundle version string.

24. The system of claim 18, wherein the instructions, when executed, further cause the at least one processor to:

detect that the second configuration of the computer program should be rolled back from the programmable device;

roll back the second configuration of the computer program to the first configuration of the computer program in response to detecting that the second configuration of the computer program should be rolled back;

modify the first update in response to rolling back the second configuration of the computer program;

generate a modified second configuration of the computer program based on the modified first update and the first configuration of the computer program;

commit the modified second configuration of the computer program to the distributed ledger;

generate a fourth configuration of the computer program based on the second update and the modified second configuration of the computer program; and commit the fourth configuration of the computer program to the distributed ledger.

25. The system of claim 24, wherein the instructions, when executed, further cause the at least one processor to: detect a flaw in the first update; and correct the flaw to generate the modified first update.

26. The system of claim 18, wherein the at least one processor is a cryptoprocessor.

\* \* \* \* \*